United States Patent [19]

Pannekeet

[11] 4,353,992

[45] Oct. 12, 1982

[54] PROCESS FOR THE REGENERATION OF A SORBENT

[75] Inventor: Wilhelmus Pannekeet, Haarlem, Netherlands

[73] Assignee: Akzona Incorporated, Asheville, N.C.

[21] Appl. No.: 217,576

[22] Filed: Dec. 18, 1980

[30] Foreign Application Priority Data

Dec. 28, 1979 [NL] Netherlands .......................... 7909337

[51] Int. Cl.$^3$ ............................................. B01J 49/00
[52] U.S. Cl. ...................................... 521/26; 210/674
[58] Field of Search ............ 127/46 A; 210/670, 674; 521/26

[56] References Cited

U.S. PATENT DOCUMENTS 2,482,765  9/1949  Haagensen ............................ 521/26
3,791,866  2/1974  Kunin et al. .......................... 521/26

Primary Examiner—Ivars C. Cintins
Attorney, Agent, or Firm—Stevens, Davis, Miller & Mosher

[57] ABSTRACT

A process is disclosed for the regeneration of a sorbent, particularly an ion exchanger used in the recovery, isolation or production of sugars, wherein a regeneration solution is used which contains at least 20 meq/l of an alkali metal hydroxide or hydroxide of an alkaline earth metal having an atomic number of at least 20, and at least 1% by weight of a monosaccharide or disaccharide.

9 Claims, No Drawings

PROCESS FOR THE REGENERATION OF A SORBENT

This invention relates to a process for the regeneration of a sorbent with the aid of an alkaline aqueous solution. Although the process may be applied to all kinds of sorbents and in many fields, it is particularly suitable to be applied to ion exchangers used in the recovery, isolation or production of sugars, more particularly in the beet sugar industry.

Beet sugar is generally obtained by cutting the beets into slices and extracting the sugar content with hot water, resulting in a dark-coloured raw sugar solution containing 10 to 15 percent by weight of sugar. The raw sugar solution is purified by adding lime and subsequently precipitating the soluble calcium compounds and the impurities in it as calcium carbonate by stepwise introduction of carbon dioxide (carbonatation). The thin juice obtained after filtration has a residual content of about 40 to 150 mg/l of calcium (calculated as calcium oxide). This amount of calcium can subsequently be removed with the aid of a strongly acid cation exchanger in the $Na^+$ form. As a result, there will be no deposition of calcium compounds in the evaporator upon concentration by evaporation of the thin juice. However, the usual regeneration of the cation exchanger charged with calcium using a large excess of sodium chloride, for instance in an amount 5 times that of the calcium absorbed (expressed in equivalents), is more and more considered a drawback in that it forms a grave environmental problem. Another problem is that the column for the actual regeneration must first be sweetened off with water in order to reduce the loss of sugar to a minimum. And also after regeneration the column must again be washed out and sweetened up. These necessary treatments lead to additional water consumption and to a dilution of the thin juice and hence to additional heat consumption in the evaporation stages. An object of the invention is to provide a process for the regeneration of the strongly acid cation exchanger in such a way that no water need be added in any stage of the process and there is no longer any need for the use of harmful sodium chloride.

After decalcification the thin juice may optionally still be demineralized by successive treatments with a strongly acid cation exchanger in the $H^+$ form and a weakly basic anion exchanger in the free base form, resulting in the removal of about 90% of the nonsugars, mainly cations and anions, contained in the thin juice. Due to this last-mentioned treatment the crystallization of sugar from the concentrated thin juice can be effected more rapidly and higher yields are obtained.

In actual practice the regeneration of a weakly basic anion exchanger is carried out with the aid of a solution of sodium hydroxide or ammonia. When use is made of ammonia, additional regeneration with sodium hydroxide is required in order to prevent a diminuation of the capacity of the anion exchanger. Drawbacks, however, are that sodium hydroxide is relatively expensive and the use of ammonia causes a grave waste water problem. Another object of the invention is to obviate the use of sodium hydroxide and ammonia by employing a regenerating agent which is relatively inexpensive and, moreover, does not give rise to a waste water problem.

To prevent the formation of invert sugar during the stepwise evaporation of the thin juice the pH must remain at a sufficiently high value. To that end it is possible, for instance, to add sodium hydroxide. The introduction in this way of alkali metal ions, however, leads to a decrease of the yield of sugar crystals. Introduction of such metal ions may be avoided by making use of a strongly basic anion exchanger in the $OH^-$ form, which is generally of the type II. In actual practice the regeneration also is effected then with the use of the relatively expensive sodium hydroxide. In that case, too, the invention provides a far less expensive regeneration agent.

In the recovery of sugar crystals the thin juice, which may have been pretreated or not is subjected to a series of evaporation steps and a thick juice having a sugar content of about 65 percent by weight is obtained. This thick juice is generally subjected to 3 successive crystallization steps. The yield of sugar crystals in the last step may be increased in an inexpensive way by complere or partial replacement of the monovalent cations with divalent cations with the aid of a cation exchanger (Quentin process). In that case, too, the process according to the invention provides a regeneration method by which the problem of waste water is reduced.

Finally, in the last stage of crystallization there is obtained a mother liquor, notably the molasses, from which it is no longer possible economically to recover sugar crystals.

The process according to the invention is characterized in that the regeneration solution contains at least 20 meq/l of an alkali metal hydroxide and/or a hydroxide of an alkaline earth metal having an atomic number of at least 20 and containing at least 1 percent by weight of mono and/or disaccharide.

It is preferred that as alkali metal hydroxide the commonly employed sodium hydroxide and as hydroxide of an alkaline earth metal the very inexpensive calcium hydroxide should be used. It is preferred that the latter substance should be prepared by adding calcium oxide to a solution of the mono and/or disaccharide.

According to the invention the hydroxide of alkali metal and/or alkaline earth metal should be present in an amount of at least 20 meq/l; the maximum concentration is determined only by the solubility of the hydroxides; this solubility may for instance be about 10 eq/l. It is preferred that per liter the solution should contain hydroxide of an alkali metal and/or alkaline earth metal in an amount of about 0.2 to about 4 eq, but particularly in an amount of 0.5 to 2 eq.

According to the invention the regeneration solution also contains at least 1% by weight of a mono and/or disaccharide, and preferably an amount ranging between 5 percent by weight and the amount determined by the solubility of the saccharide. As examples of suitable monosaccharides may be mentioned fructose or glucose. Examples of suitable disaccharides include lactose, maltose and cellobiose, more particularly saccharose. Saccharose will, of course, always be preferably used when the process according to the invention is applied to the ion exchangers employed in the beet sugar industry. It is preferred that the aqueous regeneration solution should contain 5–75% by weight of saccharose.

The process according to the invention is based on the circumstance that the hydroxides of the alkaline earth metals having an atomic number of at least 20, viz. those of calcium, barium and strontium, display a highly increased solubility in an aqueous containing at least 1 percent by weight of monosaccharide and/or disaccharide. As a result, said hydroxides of alkaline earth metals can be held in solution in relatively large amounts. Applicant assumes that this is probably to be attributed to the formation of a soluble complex in the form of the particular alkaline earth metal saccharate.

A practical embodiment according to the invention for instance permits regenerating a calcium-loaded cation exchanger with the aid of a solution of sodium hydroxide in thin juice. The presence of the saccharose makes it possible to prevent precipitation of calcium hydroxide. Examples of other embodiments of the process according to the invention include the regeneration of an anion exchanger charged with anions or of a cation exchanger charged with alkali metal ions, both regenerations being effected with the aid of a solution prepared by dissolving calcium oxide in dilute molasses. All regenerates obtained by these different modes may be re-introduced into the process in a simple manner; the regenerate obtained by the first-mentioned mode may even be directly fed to the carbonatation stage; the regenerates obtained by the two other modes may, after concentration if desired, be returned to the molasses.

It should be added that Austrian Patent Specification No. 258 230 discloses a regeneration method by which regeneration is carried out with a non-alkaline, salt-containing sugar syrup. Drawbacks to this method, however, are that the syrup is diluted and a relatively large amount of it is required, which is not always available. Other drawbacks are that the regenerate must be filtered to remove insoluble calcium carbonate and the method can be satisfactorily applied only to osmotically stable, macroporous cation exchangers. Nor does French Patent Application No. 2 190 918 mention the use of the alkaline saccharide-containing regeneration solution which is used in the process of the present invention.

The temperatures to be used in the process according to the invention may generally vary between wide limits; the extreme limits are the solidifying point and the boiling point of the regeneration liquid. In actual practice the temperature chosen is in best possible agreement with prevailing process conditions. The temperature is generally in the range of 5° to 90° C.

Regeneration may be effected in any convenient manner, for instance in a column, in upward or in downward direction.

The process according to the invention may be applied to any sorbent, more particularly to a cation exchanger or anion exchanger, which may be macroporous or not.

Cation exchangers may be prepared in a known manner, for instance by the incorporation of strongly acid groups, such as sulphonic acid groups, or weakly acid groups, such as phosphonic acid groups, carboxylic acid groups, aminocarboxylic acid groups or iminodicarboxylic acid groups into a matrix in the form of a polymer or polycondensation product. If the matrix is to be a polymer, the monomer to be used in the preparation thereof may for instance be a monovinyl aromatic compound, such as styrene, vinyl toluene, vinyl ethyl benzene, vinyl naphthalene and vinyl anisol or mixtures of the aforementioned compounds. It is preferred that the monomer to be used should be styrene. Optionally, the polymerization may be carried out in the additional presence of a cross-linking monomer in an amount of, for instance, not higher than 80 percent by weight, calculated on the total amount of monomers. The cross-linking monomer used is a compound having at least two ethylenically unsaturated groups, such as 1,3-butadiene, isoprene or vinyl methacrylate, but preferably di- or polyvinyl aromatic compounds such as divinylethyl benzene, trivinyl benzene and more particularly technical divinyl benzene. The polymer may be prepared in any convenient manner, for instance by suspension polymerization of one or more monomers at a temperature generally in the range of 10° to 160° C. in the presence of a radical initiator such as benzoyl peroxide, lauroyl peroxide, cumene hydroperoxide and/or azobisisobutyronitrile. The polymerization may be carried out in the presence, if desired, of one or more compounds capable of precipitating and/or solvating the polymer to be prepared, for instance: hexane, heptane, cyclohexane, amyl alcohol, cyclohexanol, benzene, toluene and/or chlorobenzene. Further, in the monomeric compound(s) there may be dissolved a linear polymer, such as polystyrene.

As polycondensate there may be used, for instance, a phenol-formaldehyde resin; and not only phenol itself, but also other phenols, such as cresols and diphenylol propane, may be employed.

However, also weakly acid groups may be introduced, for instance by polymerization of acrylic acid and/or methacrylic acid or one or more other ethylenically unsaturated carboxylic acids and/or one or more derivatives thereof, for instance: alkyl esters, amides and nitriles, optionally followed by hydrolysis of one or more of the derivatives.

Weakly basic or strongly basic anion exchangers may be prepared in a known manner, for instance by halogen alkylation of a matrix followed by reaction with an amine. Weakly basic anion exchangers also may be prepared by reaction of one or more carboxylic acids and/or derivatives thereof, such as esters, nitriles and acid chlorides thereof, with diamines and/or polyamines. Another method of preparing weakly basic anion exchangers consists in condensation of monoamines and/or polyamines with one or more halogen compounds, epoxy compounds and/or aldehydes. The above-envisaged weakly basic anion exchangers may partially or entirely be converted, if desired, into a strongly basic anion exchanger with the aid of a suitable alkylating agent.

The invention is further described in the following non-limitative examples and comparative examples.

COMPARATIVE EXAMPLE A

A strongly acid cation exchanger based on a sulphonated copolymer from styrene and technical divinyl benzene (known under the trade name Imac C 12 of Akzo Chemie) was used for the removal of calcium ions from a beet sugar solution. This solution (thin juice), which had been obtained in the second carbonatation step, had a strength of 15.1° Bx, a pH of 8.5 and a calcium content of 4.1 meq/l (115 mg CaO/l). At a percolation rate of 4000 ml/h and a temperature of 80° C. this solution was fed downwards through a column containing 200 ml of the afore-mentioned cation exchanger in the Na+ form. This percolation was kept up until the calcium content of the thin juice emerging from the column was 20 mg CaO/l. Nest, the thin juice left in the column was washed out with water of condensation of 80° C. until the effluent from the column had a strength lower than 0.5° Bx. The ion exchanger bed (resin bed) was subsequently backwashed with water of condensation until the emerging water was free of suspended material. After the resin bed had come to rest, the water over it was drained off to resin level.

Subsequently, the cation exchanger was regenerated by passing 400 ml of a solution of 100 g NaCl/l in upward direction through the column over a period of 1 hour at a temperature of 80° C. Next, the NaCl solution was washed out with water of condensation of 80° C. at a percolation rate of 1200 ml/hour.

The column was then used again for the removal of calcium ions from the thin juice in the manner described in the first part of this example. Upon reaching the concentration 1° Bx the thin juice percolate leaving the column was collected in the fractions given in Table 1. Of these fractions the calcium content was determined and expressed in mg CaO per liter of thin juice (see Table 1).

TABLE 1

| Percolate | Ca-content |
|---|---|
| 0– 4000 ml | 0 |
| 4000– 8000 ml | 0 |
| 8000–12000 ml | 0 |
| 12000–16000 ml | 2 |
| 16000–20000 ml | 4 |
| 20000–24000 ml | 6 |
| 24000–28000 ml | 6 |
| 28000–30000 ml | 10 |
| 30000–32000 ml | 14 |
| 32000–33000 ml | 17 |

In this way the strongly acid cation exchanger had adsorbed 653 meq calcium per liter of resin. This corresponds to only 19% of the amount of sodium chloride (3420 meq) used per liter of resin.

COMPARATIVE EXAMPLE B

The strongly acid cation exchanger obtained in Comparative example A was regenerated in the same manner as described in Comparative example A, except that use was made of 200 ml instead of 400 ml of the NaCl solution.

In the same way as described in Comparative example A the cation exchanger was subsequently used for the removal of calcium ions from a thin juice having a strength of 13.4° Bx, a pH of 9.0 and a calcium content of 4.6 meq/l (128 mg CaO/l).

The percolate was collected in the fractions given in Table 2. Of these fractions the calcium content was determined and expressed in mg CaO per liter of thin juice (see Table 2).

TABLE 2

| Percolate | Ca-content |
|---|---|
| 0– 4000 ml | 2 |
| 4000– 8000 ml | 2 |
| 8000–12000 ml | 4 |
| 12000–14000 ml | 8 |
| 14000–16400 ml | 10 |
| 16400–18400 ml | 12 |
| 18400–20400 ml | 16 |
| 20400–21400 ml | 20 |

In this way the strongly acid cation exchanger had absorbed 463 meq calcium per liter of resin. Although calculated on the amount of NaCl used per liter of resin (1710 meq) the yield had increased from 19% (Comparative example A) to 27%, the actual capacity of the resin had dropped considerably.

EXAMPLE I

The cation exchanger obtained in Comparative example B was backwashed with thin juice in the way described in Comparative example B.

The cation exchanger was subsequently regenerated by passing 200 ml of a decalcified thin juice containing 40 g (1 eq.) of sodium hydroxide per liter upwardly through the column over a period of 1 hour and at a temperature of 60° C. Subsequently, the column was washed out for 30 minutes with the aid of 600 ml of decalcified thin juice at a temperature of 60° C.

Next, the cation exchanger was used in the same way as in Comparative example A for the removal of calcium ions from a thin juice having a strength of 14.6° Bx, a pH of 8.9 and a calcium content of 4.9 meq/l (137 mg CaO/l). The percolate was collected in the fractions given in Table 4. Of these fractions the calcium content was determined and expressed in mg CaO per liter of thin juice (see Table 4).

TABLE 4

| Percolate | Ca-content |
|---|---|
| 0– 4000 ml | 5 |
| 4000– 8000 ml | 4 |
| 8000–12000 ml | 4 |
| 12000–16000 ml | 3 |
| 16000–20000 ml | 2 |
| 20000–24000 ml | 5 |
| 24000–26000 ml | 8 |
| 26000–28000 ml | 20 |

In this way the strongly acid cation exchanger had absorbed 660 meq calcium per liter of resin, the yield of regeneration being 66%. When this procedure was repeated in such a way that during regeneration use was made of non-softened thin juice, the strongly acid cation exchanger absorbed 630 meq calcium per liter of resin.

The regenerate obtained in this example may very well be worked up by introduction into the carbonatation step, the regenerate containing calcium saccharate and some non-used sodium hydroxide. In the carbonatation step the calcium saccharate is split up into calcium carbonate and saccharose. The sodium hydroxide, which is normally added for this very reason, may serve to promote the precipitation of the calcium carbonate. Moreover, in contrast with the procedure used in a regeneration with sodium chloride, the regeneration step is carried out entirely without water being introduced into the process during sweetening off and up, which saves the cost of additional evaporation of water and prevents loss of sugar.

Another possibility of working up the regenerate in this example consists in introducing a sodium compound in order to form an insoluble calcium salt. Suitable sodium compounds are, e.g., tertiary sodium phosphate and sodium silicate. It is preferred that they should be used in an amount equivalent to the amount of calcium present in the regenerate. After removal of the insoluble calcium salts by filtration the thin juice regenerate only contains sodium hydroxide and can be used in an next regeneration process, if desired.

EXAMPLE II

The same procedure is employed as in Example I, except that use is made of the cation exchanger obtained in Example I. The regeneration was carried out with the aid of 160 ml instead of 200 ml of the decalcified thin juice. So 800 meq of sodium hydroxide were used per liter of resin.

Subsequently, as in Example I, the cation exchanger was used for the removal of calcium ions from a thin juice which, however, had a strength of 13.4° Bx, a pH of 8.6, and a calcium content of 3.5 meq/l (98 mg CaO/l). The results obtained are listed in Table 5.

TABLE 5

| Percolate | Ca-content |
| --- | --- |
| 0– 4000 ml | 3 |
| 4000– 8000 ml | 2 |
| 8000–12000 ml | 2 |
| 12000–16000 ml | 2 |
| 16000–20000 ml | 2 |
| 20000–24000 ml | 2 |
| 24000–28000 ml | 2 |
| 28000–32000 ml | 8 |
| 32000–34000 ml | 20 |

In this way the cation exchanger had absorbed 572 meq calcium per liter of resin, the yield of regeneration being 71.5%.

EXAMPLE III

This Example gives the results of the removal of calcium ions from a thin juice in an beet sugar factory. The thin juice had a strength of 14.5° Bx, a pH of 9.0 and a calcium content of 2.4 meq/l (67 mg CaO/l). The plant has a processing capacity of 11,000 tons of sugar beets/day, which amounts to a production of thin juice of approximately 600 m³/hour. The same procedure was employed as in Example I. Use was made of the strongly acid cation exchanger mentioned in Comparative example A. The deliming plant comprises three columns each containing 16,000 liters of the cation exchanger, two columns always being in operation and one in regeneration. The thin juice was percolated downwardly through the column at a rate of approximately 300 m³ per hour and a temperature of 90° C. Next, the cation exchanger was regenerated by passing 16 m³ of a non-decalcified thin juice of 60° C. containing 40 kg of sodium hydroxide per m³ upwardly through the column over a period of 1 hour. Subsequently, the column was flushed for 2 hours with the aid of 48 m³ of a non-decalcified thin juice at a temperature of 90° C.

Next, the cation exchanger was used for the removal of calcium ions from the thin juice. The percolation was continued until the calcium content of the thin juice emerging from the column was 28 mg CaO/l. Up to that moment 4320 m³ of thin juice had passed through the column, the thin juice having an average CaO content of 13 mg/l. In this way the cation exchanger had absorbed 520 meq calcium per liter of resin.

EXAMPLE IV

In this example use was made of a column containing 200 ml of the sulphonic acid cation exchanger according to Example I. Regeneration of the cation exchanger was effected by passing 200 ml of a molasses solution having a strength of 20° Bx containing 40 g of sodium hydroxide per liter upwardly through the column over a period of 1 hour and at a temperature of 60° C.

Subsequently, the column was flushed for 30 minutes with the aid of 600 ml of a molasses solution having a strength of 20° Bx at a temperature of 60° C. Next, the cation exchanger was used in the same way as in Example I for the removal of calcium ions from a thin juice which, however, had a strength of 14.0° Bx, a pH of 9.0, and a calcium content of 4.6 meq/l (128 mg CaO/l). The results obtained are listed in Table 6.

TABLE 6

| Percolate | Ca-content |
| --- | --- |
| 0– 4000 ml | 7 |
| 4000– 8000 ml | 7 |
| 8000–12000 ml | 7 |
| 12000–16000 ml | 6 |
| 16000–20000 ml | 6 |
| 20000–24000 ml | 8 |
| 24000–26000 ml | 8 |
| 26000–28000 ml | 8 |
| 28000–30000 ml | 15 |

In this way the strongly acidic cation exchanger had absorbed 645 meq calcium per liter of resin. The regenerate obtained in this example may be returned to the final molasses after concentration.

EXAMPLE V

A weakly acid cation exchanger of the acrylic acid type (known under the trade name Imac Z 5 of Akzo Chemie) was used for the removal of calcium ions from a thin juice. This solution had a strength of 15.1° Bx, a pH of 8.5 and a calcium content of 4.1 meq/l (115 mg CaO/l) and was passed at a percolation rate of 4000 ml/hour and a temperature of 80° C. downwardly through a column containing 200 ml of the aforementioned cation exchanger in the neutralised Na+ form. The percolation was kept up until the calcium content of the thin juice leaving the column was 20 mg CaO/l.

Next, the weakly acid cation exchanger was backwashed with clear filtered thin juice until the emerging thin juice was free of suspended material. After the resin bed had come to rest, the thin juice over it was drained off to resin level.

Regeneration of the weakly acid cation exchanger was subsequently effected by passing 200 ml of a decalcified thin juice containing 40 g of sodium hydroxide per liter in upward direction through the column at a temperature of 60° C. over a period of 1 hour. Next, the column was washed out for 30 minutes with the aid of 600 ml of decalcified thin juice at a temperature of 60° C.

The resulting cation exchanger was re-used in the same way as in Example I for the removal of calcium ions from a thin juice having a strength of 14.4° Bx, a pH of 9.2 and a calcium content of 5.1 meq/l (144 mg CaO/l). The percolate was collected in the fractions given in Table 7. Of these fractions the calcium content was determined and expressed in mg CaO per liter of thin juice (see Table 7).

TABLE 7

| Percolate | Ca-content |
| --- | --- |
| 0–4000 ml | 5 |
| 4000–8000 ml | 8 |
| 8000–9000 ml | 18 |

In this way the cation exchanger had absorbed 219 meq calcium per liter of resin.

EXAMPLE VI

The same procedure was employed as in Example V, except that use was made of a weakly acid cation exchanger of the phosphonic acid type in the neutralised Na+ form, based on a macroporous copolymer of styrene and technical divinyl benzene (known under the trade name Imac SYN 102 of Akzo Chemie).

The thin juice treated with the regenerated cation exchanger had a strength of 14.9° Bx, a pH of 8.5 and a calcium content of 5.4 meq/l (150 mg CaO/l). The results obtained are given in Table 8.

TABLE 8

| Percolate | Ca-content |
|---|---|
| 0–4000 ml | 0 |
| 4000–5000 ml | 12 |
| 5000–6000 ml | 17 |

In this way the cation exchanger had absorbed 156 meq calcium per liter of resin.

EXAMPLE VII

In this example use was made of 6 columns (A–F) that were each filled with 200 ml of the sulphonic acid cation exchanger according to Example I. Regeneration of the cation exchanger was effected by passing 200 ml of a solution containing 40 g of sodium hydroxide per liter and an amount by weight of saccharose per liter mentioned in Table 9 upwardly through each of the columns over a period of 1 hour at a temperature of 60° C. Next, the column was washed out with a saccharose solution having the same concentration as the regenerant at a percolation rate of 1200 ml per hour and a temperature of 60° C. The amount of washing liquid is given in Table 9. During regeneration a precipitate is formed in the columns A–C. This precipitate was removed from the columns B and C during washing with the afore-mentioned saccharose solution.

Subsequently, use being made of the same procedure as in Example I, the columns were employed for the removal of calcium ions from a thin juice whose strength, pH and calcium content are given in Table 9. The percolate was collected in the fractions mentioned and the calcium content thereof was determined (see Table 9). The calcium content is invariably expressed in mg CaO/l. Table 9 also mentions the calcium absorption (in meq) per liter of resin of the cation exchanger.

TABLE 9

| | Columns | | | | | |
|---|---|---|---|---|---|---|
| | A | B | C | D | E | F |
| amount of saccharose in regenerant (g/l) | 0 | 10 | 50 | 100 | 150 | 300 |
| amount of washing liquid (ml) | 1000 | 1200 | 200 | 600 | 600 | 600 |
| thin juice | | | | | | |
| strength (°Bx) | 13,6 | 14,5 | 13,2 | 15,0 | 14,9 | 15,0 |
| pH | 8,5 | 8,5 | 8,6 | 8,4 | 8,4 | 8,4 |
| calcium content | 110 | 119 | 114 | 122 | 139 | 121 |
| percolate | | | calcium content | | | |
| 0– 4000 ml | 78 | 32 | 7 | 1 | 1 | 5 |
| 4000– 8000 ml | — | — | 9 | 3 | 3 | 4 |
| 8000 –12000 ml | | | 22 | 3 | 4 | 2 |
| 12000–16000 ml | | | — | 2 | 3 | 4 |
| 16000–20000 ml | | | | 4 | 5 | 7 |
| 20000–24000 ml | | | | 4 | 20 | 20 |
| 24000–26000 ml | | | | 6 | — | — |
| 26000–28000 ml | | | | 10 | | |
| 28000–30000 ml | | | | 28 | | |
| amount of calcium absorbed (meq) per liter of resin | 23 | 62 | 217 | 626 | 572 | 490 |

EXAMPLE VIII

In this example use was made of 3 columns (A–C), each containing 200 ml of the sulphonic acid cation exchanger according to Example I. Regeneration of the cation exchanger was effected by passing 200 ml of a decalcified thin juice containing 40 g of sodium hydroxide per liter upwardly through each of the columns at a temperature of 20° C. (column A), 60° C. (column B) and 90° C. (column C), respectively, over a period of 1 hour. Subsequently, the alkaline thin juice in the columns was washed out over a period of 30 minutes with the aid of 600 ml of decalcified thin juice at a temperature of the same value as the regeneration temperature. Regeneration was attended with the formation in column C of a precipitate which disappeared again during washing out.

Next, the columns were used in the same way as indicated in Example I for the removal of calcium ions from a thin juice whose strength, pH and calcium content was given in Table 10. The percolate was collected in the fractions mentioned and the calcium content was determined (see Table 10). The calcium content is invariably expressed in mg CaO/l. Table 10 also mentions the calcium absorption in meq per liter of resin.

TABLE 10

| | Columns | | |
|---|---|---|---|
| | A | B | C |
| Thin juice: | | | |
| strength (°Bx) | 14,0 | 14,9 | 13,6 |
| pH | 9,2 | 8,4 | 8,8 |
| calcium content | 118 | 139 | 158 |
| Percolate | Calcium content | | |
| 0– 4000 ml | 6 | 1 | 5 |
| 4000– 8000 ml | 5 | 3 | 6 |
| 8000–12000 ml | 6 | 4 | 6 |
| 12000–16000 ml | 4 | 3 | 7 |
| 16000–20000 ml | 5 | 5 | 20 |
| 20000–24000 ml | 8 | 20 | — |
| 24000–26000 ml | 18 | — | — |
| amount of calcium absorbed (meq) per liter of resin | 515 | 572 | 535 |

EXAMPLE IX

Use was made of 2 columns (A and B) each containing 200 ml of the sulphonic acid cation exchanger according to Example I. Regeneration of the cation exchanger was effected by passing 200 ml of solution containing 40 g of sodium hydroxide per liter and 110 g of fructose (column A) and 110 g of lactose (column B) per liter upwardly through the respective column over a period of 1 hour and at a temperature of 60° C.

Next, the column was washed out for 1 hour with 1200 ml of a solution of 110 grammes of the respective saccharide per liter. During regeneration a precipitate was formed in the columns, which disappeared again during washing out.

Subsequently, the two columns were used in the same way as indicated in Example I for the removal of calcium ions from a thin juice having a strength of 14.5° Bx, a pH of 8.3 and a calcium content of 110 mg CaO/l. The percolate was collected in the fractions mentioned and the calcium content thereof was determined and expressed in mg CaO/l (see Table 11). Table 11 also gives the final calcium absorption in meq per liter of resin of the cation exchanger.

TABLE 11

| Percolate | Calcium content | |
|---|---|---|
| | Column A | Column B |
| 0– 4000 ml | 4 | 4 |
| 4000– 8000 ml | 4 | 4 |
| 8000–12000 ml | 7 | 4 |
| 12000–16000 ml | 7 | 5 |
| 16000–18000 ml | 7 | 6 |
| 18000–20000 ml | 10 | 11 |
| 20000–22000 ml | 16 | 20 |
| amount of calcium absorbed (meq) per liter of resin | 410 | 407 |

EXAMPLE X

In this example the cation exchanger according to Example I was used for softening Amsterdam tap water. The tap water, which had a hardness of 125 mg CaO/l, was fed at a percolation rate of 4000 ml per hour downwardly through a column containing 200 ml of the aforementioned cation exchanger whch was in the $Na^+$ form. The percolation was kept up until the hardness of the water leaving the column was 10 mg CaO/l.

Subsequently, regeneration was effected by passing 200 ml of a solution of 60 g of sodium hydroxide and 220 g of saccharose per liter in upward direction through the column over a period of 1 hour and at a temperature of 20° C. Next, the column was washed out for 30 minutes with 600 ml of a solution of 220 g saccharose at a temperature of 20° C., after which the column was flushed with tap water until it was no longer found to contain any saccharose.

The cation exchanger was then used in the same way as described in the first part of this example for removing hardness ions from tap water. The percolate was collected in the fractions given in Table 12 and the hardness thereof was determined (expressed in mg CaO/l):

TABLE 12

| Percolate | hardness |
|---|---|
| 0–1 | 4 |
| 10–20 1 | 4 |
| 20–30 1 | 6 |
| 30–40 1 | 8 |
| 40–42 1 | 10 |

In this way the cation exchanger had absorbed 895 meq of hardness ions.

EXAMPLE XI

Beet sugar thin juice decalcified in a preceding step was demineralized by means of the strongly acid cation exchanger form according to Example I in the $H^+$ form and a weakly basic anion exchanger in the free base form and based on a macroporous copolymer of styrene and divinyl benzene (known under the trade name Imac A 20 SU of Akzo Chemie). About 90% of the non-sugars, i.e. 188 g per liter of anionic resin, contained in the thin juice, mainly cations and anions, were removed. To that end decalcified thin juice having a strength of 14.5° Bx and a pH of 9.2 was passed in downward direction at a percolation rate of 1200 ml/hour and a temperature of 11° C. successively through a column containing 200 ml of said cation exchanger and a column containing 200 ml of said anion exchanger. The percolation was kept up until the pH of the emerging thin juice had dropped to 4.5. Subsequently, the two columns were sweetened off with water of condensation and backwashed.

Next, the cation exchanger was regenerated in downward direction for 30 minutes with 200 ml of a solution of 120 g of sulphuric acid per liter and subsequently washed out with water of condensation until acid free.

The anion exchanger was regenerated by passing 400 g of a solution, whic had been obtained by adding calcium oxide to a molasses solution having a strength of 19° Bx until it contained 750 meq CaO/kg, at a percolation rate of 400 ml/hour and at a temperature of 15° C. downwardly through a column. The regenerate contained in the column was washed out with water of condensation of 15° C. at a percolation rate of 1200 ml/hour until the strength of the effluent from the column had dropped to 0.5° Bx.

Subsequently, the two columns were used again for the demineralization of the thin juice in the manner described in the first part of this example. After the two columns had been sweetened up to 1° Bx the percolate was collected in total until the pH of the thin juice emerging from the last column had dropped to 4.5. The purity quotient of the original thin juice (89.49), that of the percolate (98.63) and the total weight of the percolate served as a basis for calculating the amount of non-sugars, expressed in grammes per liter of anion exchanger, that had been removed by the combination of the two resins. It was found that per liter of anionic resin 184 g of non-sugars had been removed.

EXAMPLE XII

The same procedure was employed as in Example XI, except that the regeneration solution used for the anion exchanger had a strength of 8° Bx and a calcium content of 150 meq CaO per kg of solution. Regeneration of the anion exchanger, however, was effected with the aid of 2000 grammes of the regeneration solution and at a percolation rate of 800 ml/hour.

The purity quotient of the original thin juice was 90.16 and that of the percolate 97.50. It was found that per liter of anionic resin 145 g of non-sugars had been removed.

EXAMPLE XIII

The same procedure was employed as in Example XI, except that use was made of a weakly basic anion exchanger based on a polyacryl ester amidated with dimethylaminopropyl amine (known under the trade name Imac SYN A 572 of Akzo Chemie).

The purity quotient of the original thin juice was 89.30 and that of the percolate 97.93. It was found that per liter of anionic resin 206 g of non-sugars had been removed.

EXAMPLE XIV

A strongly basic type II anion exchanger in the $OH^-$ form was used for introducing hydroxyl ions into thin juice in order to prevent the formation of invert sugar during evaporation of the thin juice. To that end decalcified thin juice having a strength of 15.1° Bx and a pH of 8.6 was passed at a percolation rate of 1200 ml/hour and at a temperature of 35° C. downwardly through a column containing 200 ml of said strongly basic anion exchanger (known under the trade name Imac S 5.42 of Akzo Chemie). The percolation was kept up until the pH of the thin juice leaving the column had dropped to 9.5. Next, the column was sweetened off to 0.5° Bx with water of condensation at a temperature of 35° C., after which it was backwashed.

Subsequently, the strongly basic anion exchanger was regenerated with 400 g of a solution, which had been obtained by adding calcium oxide to a molasses solution having a strength of 19° Bx until it contained 750 meq CaO/kg, at a percolation rate of 400 ml/h and at a temperature of 35° C. downwardly through the column. The regenerate in the column was washed out with water of condensation at a percolation rate of 1200 ml/hour and at a temperature of 35° C. until the strength of the effluent has decreased to 0.5° Bx.

Next, the anion exchanger was used again for the treatment of the thin juice in the manner described in the first part of this example. The percolate was collected in the fractions given in Table 13 and the pH thereof was determined. It was found that the pH of the thin juice had distinctly increased.

TABLE 13

| Percolate | pH of thin juice |
|---|---|
| 0–400 ml | 11,80 |
| 400–800 ml | 11,45 |
| 800–1200 ml | 10,65 |
| 1200–1600 ml | 9,80 |
| 1600–2000 ml | 9,55 |

EXAMPLE XV

It is known that the exchange of monovalent cations from the syrups obtained in the 2nd crystallization step of the beet sugar recovery process (the so-called B-syrup) for divalent cations with the aid of a strongly acid cation exchanger leads to an increase in the yield of sugar crystals in the 3rd crystallization step. A commonly used divalent cation is magnesium. In the Quentin process strongly acid cation exchangers are regenerated with a solution of magnesium chloride. The regenerate mainly contains potassium chloride and sodium chloride, which may cause a grave waste water problem.

The process described hereinafter permits introducing calcium as divalent cation into the B-syrup without creating a waste water problem. To that end B-syrup was passed downwardly through a column containing 200 ml of a macroporous sulphonic acid cation exchanger (known under the trade name Imac C 16 P of Akzo Chemie) which is in the $Ca^{2+}$ form, at a temperature of 90° C. and a percolation rate of 300 ml/hour until the composition of the B-syrup leaving the column was identical with that of the B-syrup entering it. Next, the resin was sweetened off to 0.5° Bx with water of condensation of 90° C. and subsequently backwashed. The B-syrup used had a strength of 70° Bx and a pH of 7.8 and contained 2.10% K, 0.37% Na, 0.03% Ca and 0.10% Mg.

The resin was subsequently regenerated by passing 700 grammes of a molasses solution having the strength of 19° Bx and containing 454 meq CaO/kg downwardly through the column at a percolation rate of 600 ml/hour and at a temperature of 60° C. Subsequently, the regenerate in the column was washed out with water of condensation of 60° at a percolation rate of 1200 ml/hour until the strength of the effluent had dropped to 0.5° Bx. The regenerate and the washing water were collected. From the calcium content of the regenerating agent and that of the regenerate with washing water it was calculated that the resin had absorbed 671 meq calcium/liter resin. After the regenerate had been concentrated by evaporation it could be fed back to the molasses.

In the Quentin process, the divalent cation being magnesium, the resin is generally regenerated with a solution of $MgCl_2$. A more attractive procedure consists in regeneration with a solution of $MgSO_4$, as a result of which the regenerate contains $SO_4^{2-}$ ions, which can be precipitated with $Ca^{2+}$ ions. In this way the waste water problem could be considerably reduced. This is possible only when at the moment of regeneration the resin contains few or no $Ca^{2+}$ ions. Otherwise the calcium still present on the resin would cause precipitation of calcium sulphate in the resin bed, which should as much as possible be avoided. The presence of calcium on the resin is often inevitable. Consequently, for regenerating the resin the magnesium sulphate can be used only in a very weak solution. The advantage of the use of magnesium sulphate will generally be offset then by the large increase in water consumption due to the required dilution of the magnesium sulphate. The process in accordance with Example I, however, yet permits using magnesium sulphate of the normal regeneration concentrations of 1–1½ N.

In accordance with the process described in Example I the regeneration with magnesium sulphate may be preceded by freeing the resin of calcium by regeneration with a solution of sodium hydroxide in thin juice.

EXAMPLE XVI

A thin juice having a strength of 15.0° Bx, a pH of 8.6 and a calcium content of 4.6 meq/l (130 mg CaO/l) was first passed downwardly through a column containing 200 ml of the sulphonic acid cation exchanger according to Example I at a percolation rate of 4000 ml/h and a temperature of 80° C. and subsequently, for the purpose of decoloration, downwardly through a column containing 200 ml of a macroporous weakly basic anion exchanger based on an amidated polyacrylic ester (known under the trade name IMAC SYN A 574 P of Akzo Chemie). The percolation was continued for 7 hours, the calcium content of the thin juice leaving the first column was 17 mg CaO/l. Next, the two columns were separately backwashed with thin juice until the emerging juice was free of suspended material. After the resin beds had come to rest, the juice was drained off to resin level.

Regeneration in series of the two ion exchangers was subsequently effected by passing 200 ml of a decalcified thin juice containing 40 g of sodium hydroxide per liter over a period of 1 hour and at a temperature of 60° C. upwardly through the first column and downwardly through the second column. The two columns were flushed in series for 60 minutes with the aid of 1200 ml of decalcified thin juice at a temperature of 60° C.

The two columns were re-used in the same way as described in the first part of this example for the purpose of removal of calcium and coloured substances from a thin juice having a strength of B 14.6° Bx, a pH of 9.1, a calcium content of 3.8 meq/l (107 mg CaO/l) and absorbance at 560 nm (measured in a 1 cm cell) of 0.205.

The percolate was collected in the fractions given in Table 14. Of these fractions the calcium content and colour absorbance were determined.

TABLE 14

| Percolate | Ca-content | Colour absorbance (560 nm) |
|---|---|---|
| 0– 4000 ml | 2 | 0,040 |
| 4000– 8000 ml | 4 | 0,040 |
| 8000–12000 ml | 3 | 0,050 |
| 12000–16000 ml | 3 | 0,056 |
| 16000–20000 ml | 2 | 0,062 |
| 20000–24000 ml | 2 | 0,071 |
| 24000–28000 ml | 2 | 0,073 |
| 28000–32000 ml | 4 | 0,082 |
| 32000–34000 ml | 16 | 0,086 |

In this way the strongly acidic cation exchanger had adsorbed 628 meq calcium per liter of resin and the weakly basic anion exchanger caused an average decrease of 69% of colour absorbance of the original thin juice.

The regeneration step is carried out entirely without water being introduced into the process, which saves the cost of additional evaporation and prevents sugar loss during sweetening off and sweetening up. Moreover, decoloration is obtained without additional costs of regeneration. Similar results are found with other weakly basic resin types.

Series regeneration can also be obtained with diluted molasses containing NaOH, in which case the regenerate can be returned to the final molasses.

EXAMPLE XVII

The same procedure was employed as in Example XVI, except that for the purpose of decoloration use was made of a macroporous copolymer of styrene and technical divinyl benzene (known under the trade name IMAC SYN 46 of Akzo Chemie).

The thin juice treated with the regenerated cation exchanger and macroporous copolymer had a strength of 14.8° Bx, a pH of 9.2, a calcium content of 4.4 meq/l (124 mg CaO/l) and an absorbance at 560 nm (measured in a 1 cm cell) of 0.225. The percolate was collected in the fractions given in Table 15. Of these fractions the calcium content and colour absorbance were determined.

TABLE 15

| Percolate | Ca-content | Colour absorbance (560 nm) |
|---|---|---|
| 0– 4000 ml | 4 | 0,187 |
| 4000– 8000 ml | 5 | 0,190 |
| 8000–12000 ml | 6 | 0,198 |
| 12000–16000 ml | 7 | 0,200 |
| 16000–20000 ml | 6 | 0,205 |
| 20000–24000 ml | 6 | 0,207 |
| 24000–28000 ml | 10 | 0,210 |
| 28000–30000 ml | 20 | 0,210 |

In this way the strongly acidic cation exchanger had absorbed 626 meq calcium per liter of resin and the macroporous copolymer gave an average decoloration of approx. 10% of the original thin juice.

What is claimed is:

1. A process for regenerating an ion exchange resin sorbent which comprises washing said sorbent with an aqueous alkaline solution containing at least 20 meq/l. of an alkali metal hydroxide or alkaline earth metal hydroxide having an atomic number of at least 20, and at least one percent by weight of a monosaccharide or disaccharide.

2. The process of claim 1, wherein the hydroxide is sodium hydroxide.

3. The process of claim 1, wherein the hydroxide is calcium hydroxide.

4. The process of claim 1, wherein the disaccharide is saccharose.

5. The process of claim 4, wherein the aqueous solution contains 5–75% by weight of saccharose.

6. The process of claim 1, wherein the aqueous solution contains about 0.2 to about 4 eq/l of the hydroxide.

7. The process of claims 1, 2, 3, 4 or 6 wherein the regeneration is carried out at a temperature in the range of from the solidifying point to the boiling point of the solution.

8. The process of claim 7, wherein the regeneration is carried out at a temperature in the range of from 5° to 90° C.

9. The process of claim 1 wherein the said ion exchange resin is washed with water after washing with said aqueous alkaline solution.